March 1, 1960 R. K. RICHARDS 2,926,850

BINARY ADDER SUBTRACTER

Filed Jan. 3, 1955 3 Sheets-Sheet 1

INVENTOR.
RICHARD K. RICHARDS

BY P. E. Henninger

ATTORNEY

March 1, 1960 R. K. RICHARDS 2,926,850

BINARY ADDER SUBTRACTER

Filed Jan. 3, 1955 3 Sheets-Sheet 2

INVENTOR.
RICHARD K. RICHARDS

BY [signature]

ATTORNEY

INVENTOR.
RICHARD K. RICHARDS
BY P. E. Henninger
ATTORNEY

United States Patent Office 2,926,850

Patented Mar. 1, 1960

2,926,850

BINARY ADDER SUBTRACTER

Richard K. Richards, Poughkeepsie, N.Y., assignor to International Business Machines Corporation, New York, N.Y., a corporation of New York Application January 3, 1955, Serial No. 479,338

6 Claims. (Cl. 235—175)

This invention is concerned with a binary calculator. More specifically, the invention deals with an adder-subtracter with direct subtraction, i.e., the subtraction being accomplished without employing the well-known procedure of complementing one number and adding. In other words, the subtracter operation which this invention can accomplish will directly subtract one binary number from another and produce a true difference.

An object of this invention is to provide a binary subtracter which can produce directly a difference between two binary numbers without first complementing one number and adding to the other.

Another object is to provide a unit for use in a binary calculator, which unit will give a sum or difference of two binary digits in a direct manner, while at the same time providing a carry or borrow signal. Such a unit can be joined with other similar units as desired for any number of orders of a binary number.

Briefly, the invention consists of a binary adder-subtracter including means for receiving one of three control signals, depending upon which of three functions is to be performed, the three functions being respectively: (1) subtraction of a first number from a second; (2) subtraction of the second number from the first; and (3) addition of the first and second numbers. The adder-subtracter comprises, for each order, switching circuit means for receiving signals that represent corresponding binary digits of the first and second numbers. The switching circuit means for each order includes a plurality of "and" circuits, a plurality of "or" circuits, and a first output circuit for producing a sum or difference signal, depending upon which of said three control signals is received.

The above and other objects and principles of the invention are described below, and are illustrated in the drawings where:

Figures 1, 2:
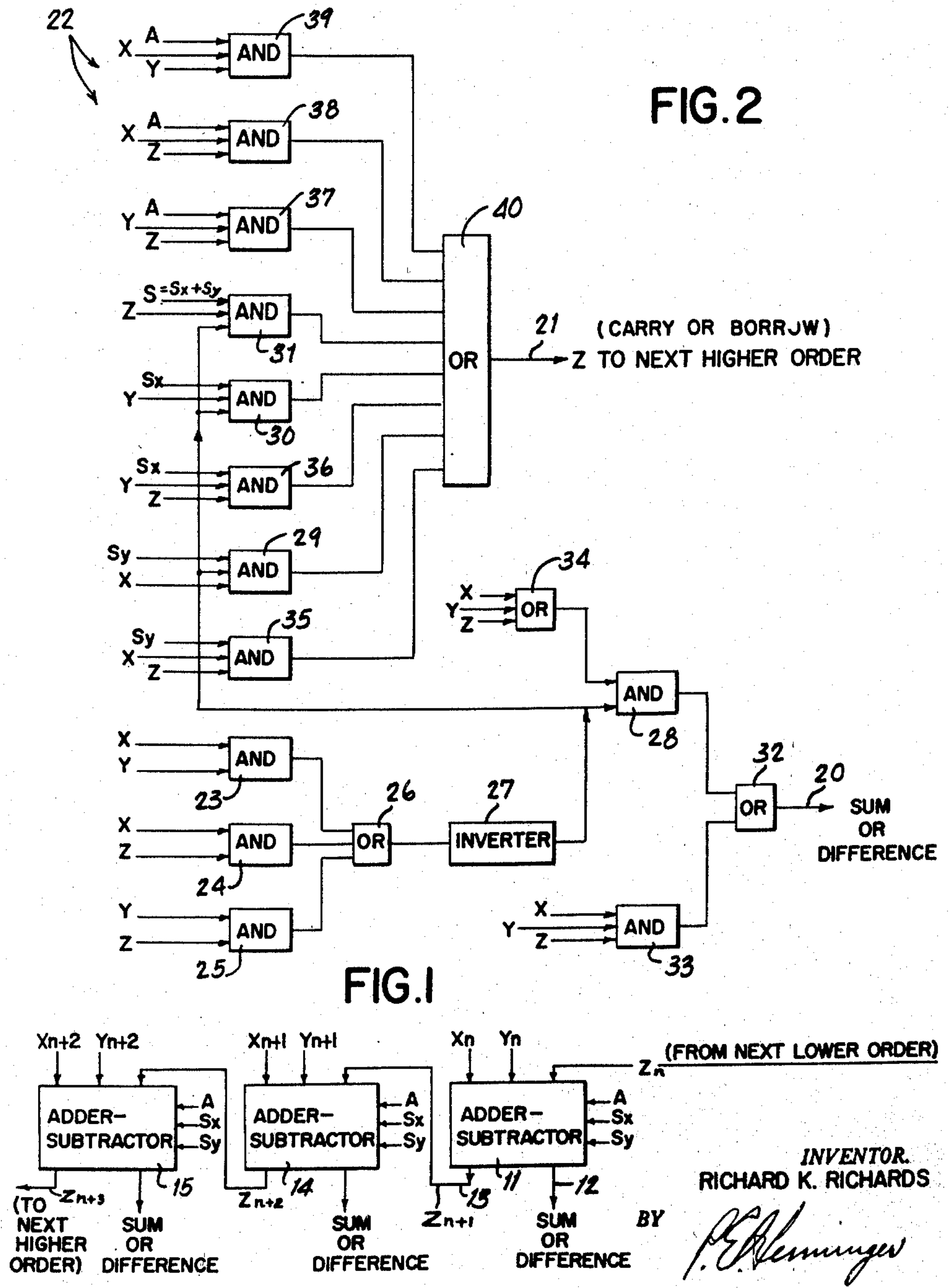
Fig. 1 shows three adder-subtracter units connected together for so called "parallel" operation to operate upon three consecutive orders of a binary number.
Fig. 2 is a block diagram circuit illustrating one embodiment of the invention.

In binary numbers, a digit is represented as either a "1" or a "0," and consequently binary calculators employ various arrangements whereby a "1" is represented by the presence of a signal, while a "0" is represented by the absence of such a signal.

Although binary adders in general are old and well known in the art, heretofore, subtraction has been accomplished by the cumbersome process of complementing a number and adding such complement to the number from which a subtraction is to be made. With an arrangement according to this invention, subtraction of two binary numbers, one from the other, may be accomplished directly without any such complementing and adding.

In order to understand how this direct subtraction is accomplished, reference will first be had to an example of binary subtraction as accomplished in a pencil-and-paper manner, i.e. by writing down the two numbers and making the mental steps necessary in connection with the subtraction for each order of the two numbers. For example, a given binary number which may be represented as X may have another binary number which may be represented as Y, subtracted therefrom, and the difference will be determined by subtracting Y from X successively by digits, beginning with the lowest order digit and going to the highest order digit. This may be illustrated as follows:

$$\begin{array}{r} X=0\ 1\ 0\ 0\ 1 \\ Y=0\ 0\ 0\ 1\ 0 \\ \hline \text{Difference}=0\ 0\ 1\ 1\ 1 \end{array}$$

It will be observed that this result is accomplished mentally by first subtracting 0 from 1 in the lowest order digit, the difference being 1; then subtracting 1 from 0 in the next order, which involves the necessity of a borrow from the next higher order and includes the fact that the borrowed number from the next higher order has a value of 2, so that the difference will again be 1. Then in the next higher order, 0 will be subtracted from 1, which 1 was obtained by borrowing from the next higher order above this one, since the order just below had required a borrow and had had to go on to the next higher order before finding a positive number from which to borrow. The borrowing process then left a remainder of 1 in the third order (now being considered), so that Y which is 0 in this order is subtracted from the remainder 1, giving a difference of 1 in the third order. Finally, in the fourth order, Y is 0 and X is now 0 (having had its 1 borrowed from below) so that the difference is zero. Of course, the highest order (being two 0's) has a difference of 0.

Now, in accomplishing this subtraction with the use of binary calculator circuits, it will be found that the difference which is obtained by such subtraction is obtained by a combination of the presence and absence of signals which is similar to the combination of such signals employed when adding two binary numbers. This statement may best be explained with reference to Boolian algebra.

In Boolian algebra, a digit may be represented as X or Y for any given order, and a carry or borrow signal may be represented as Z. In Boolian algebra, a product expresses the summation of the quantities, e.g. XYZ stands for an X digit <u>and</u> a Y digit <u>and</u> a carry or borrow signal. A sum, or plus sign, in Boolian algebra means an alternative, e.g. $XY+XZ+YZ$ indicates a digit X <u>and</u> a digit Y, <u>or</u> a digit X <u>and</u> a carry or borrow signal, <u>or</u> a digit Y <u>and</u> a carry or borrow signal. In addition the symbol bar (‾) indicates the absence of a signal, i.e. it means <u>not</u> that signal. For example, in binary addition, the sum of two digits of a given order may be expressed as follows: $X\bar{Y}\bar{Z}+\bar{X}\bar{Y}Z+\bar{X}Y\bar{Z}+XYZ$. Similarly, the carry signal from one order to the next higher order may be expressed as $XY\bar{Z}+X\bar{Y}Z+\bar{X}YZ+XYZ$.

Referring to the subtraction of two binary numbers, e.g. as set forth in the example above, it will be observed that for any given order, a digit of the difference may be represented in Boolian algebra as follows:

$$X\bar{Y}\bar{Z}+\bar{X}Y\bar{Z}+\bar{X}\bar{Y}Z+XYZ$$

It will also be observed that the expression for such a difference is symmetrical, and consequently it makes no difference whether X or Y is the minuend. Of course, it must be remembered that in subtraction, the Z stands for a borrow signal from the next lower order. However, it may be verified in connection with the pencil and paper example set forth above, that to express the possibilities for obtaining a borrow signal to be applied from a given order to the next higher order, the combinations are as follows: $\bar{X}\bar{Y}Z+\bar{X}Y\bar{Z}+\bar{X}YZ+XYZ$, when X is the minuend. It will be noted that this expression is not symmetrical with regard to X and Y, so that to determine when a borrow signal is to be sent to the next higher order, it does make a difference as to which of the two numbers is the minuend and which is the subtrahend. For this reason the subtracter according to this invention must employ a control signal for each of the two conditions, i.e. one control signal when X is the minuend, and another control signal when X is the subtrahend (i.e., when Y is the minuend). Also, since the expression representing a borrow signal is in each case different from the expression representing a carry signal, when the two numbers are added a third control signal must be employed if the unit is to be employed for addition as well as for subtraction.

Referring to Fig. 1 it will be observed that an individual unit is employed for each order of the binary numbers that are being added or subtracted. In other words, there is a unit 11 which has three inputs that are designated $X_n$, $Y_n$ and $Z_n$, which will have signals introduced representing an X digit, a Y digit and a carry or borrow signal from the next lower order. In addition, there are three other inputs that are designated A, $S_x$, and $S_y$ which represent the control signal inputs as explained above, A representing the control signal for adding, $S_x$ representing the control signal for subtracting with X as the minuend, and $S_y$ representing the control signal with Y as the minuend. There are two outputs 12 and 13 that carry the final output signals for the given order of the binary number that is being operated on in the unit 11. The output 12 provides the sum or difference, depending upon which of the three control signals is applied to the unit 11, while the output 13 carries the carry or borrow signal that is applied to the next higher order, in the manner indicated by the showing of the letter $Z_{n+1}$ adjacent to output line 13. It will be readily observed that units 14 and 15 are in all respects the same as the unit 11, and when connected together in cascade as to the carry or borrow signals, unit 14 represents the next higher order above unit 11 and unit 15 the next higher order above unit 14, as indicated by the designation in connection with the digit input signals, i.e., $X_{n+1}$, $Y_{n+1}$, and $X_{n+2}$, $Y_{n+2}$, and the carry or borrow signals $Z_{n+2}$, $Z_{n+3}$.

In effecting a subtraction of two digits having the same order, the circuit for accomplishing the desired operation may be like that illustrated in Fig. 2. It will be appreciated by anyone skilled in the art that there are various so-called "and" circuits as well as "or" circuits, which can accomplish the designated function when various signals are applied thereto. For example, an "and" circuit having three inputs, will not produce any output unless there are signals present on all three of the inputs simultaneously, whereas, in an "or" circuit there may be any given number of inputs, and a signal present on anyone of these inputs will produce an output signal therefrom.

It is also well known that an inverter circuit of various types may be employed to produce an inverted output signal which when combined with a non-inverted signal will cancel or inhibit the same. Such an arrangement has been employed and is well known in binary addition circuits, heretofore. In connection with such an arrangement, an "and" circuit may have two inputs, one of which may be considered as a positive signal, while the other is an inverted signal, the circuit values being such that the positive input signal in the absence of the inverted signal will produce an output, while the coexistence of an input signal with the inverted signal will cancel and provide no output. With this in mind and referring to Fig. 2, it is pointed out that there is a circuit arrangement for providing subtraction as well as addition of two binary digits of a corresponding order, so that an output signal representing the sum or the difference will be produced and also an output signal representing the carry or borrow to be applied to the next higher order will be produced.

Referring to the circuit of Fig. 2, there is an output circuit 20 that is for providing the sum or difference signal from the unit as indicated. There is another output circuit 21 that is for providing the carry or borrow signal to be applied to the next higher order as indicated by the letter Z, and caption. There are a plurality of inputs 22 which will be connected to receive signals of a nature as indicated by the letters X, Y, A, Z, $S_x$ and $S_y$. These signals represent the two digit signals which are represented by X and Y, as pointed out above, while the letter Z represents the carry or borrow signal which is received from the next lower order. The letter A indicates a control signal to be applied when the digits X and Y are to be added. The letter S represents a control signal to be applied whenever the digits are to be subtracted from one another, i.e. when X is subtracted from Y or vice-versa, while $S_x$ represents a control signal to be applied when subtracting with X as the minuend and $S_y$ represents a signal to be applied when subtracting with Y as the minuend. In terms of Boolian algebra, $S=S_x+S_y$. It will be noted that there is a group of three "and" circuits 23, 24 and 25, all of which have outputs leading to the input of a single "or" circuit 26, the output of which leads to an inverter 27 that has an output carried as indicated to four different inputs in parallel, one being an "and" circuit 28, while the other three are "and" circuits 29, 30 and 31. The output of "and" circuit 28 leads to a final "or" circuit 32, the output of which is output 20 for the unit. There is an "and" circuit 33 having as its inputs circuits for the three quantities as representing digit X, digit Y and carry or borrow Z. The output of this "and" circuit 33 leads to another input of the "or" circuit 32. It may be noted that the portion of the entire unit which produces the sum or difference signal, and which operates in the same manner whether adding or subtracting, includes the elements just described and an "or" circuit 34 having three inputs representing X, Y and Z, the output of which leads to one of the inputs for the "and" circuit 28.

The rest of the circuit includes five other "and" circuits 35, 36, 37, 38 and 39, each of which has three inputs as indicated, that include various combinations of X, Y, Z, and the control signals A, S, $S_x$ and $S_y$. All of the group of eight "and" circuits, consisting of the five just mentioned plus the circuits 29, 30 and 31, have outputs leading into an "or" circuit 40, the output of which is the output 21 that carries the Z signal (which may be a carry or a borrow depending upon the operation being performed) to the next higher order.

An example of the operation of a unit according to this invention, as illustrated in Fig. 2, will clarify the means by which the direct subtraction is accomplished. Taking the next to the lowest order of digits from the example of binary subtraction given above, it will be observed that the action of the circuit arrangement according to Fig. 2 is as follows: First of all, the control signal lines $S_x$ will have a signal applied thereto, while there will be an absence of control signals applied to the lines marked "A" and $S_y$. This is because the subtraction being effectuated is one where X is the minuend. In addition, a control signal is applied over line S to the "and" circuit 31 since this signal is applied when subtracting with either X or Y as the minuend.

Now, in the example taken, X is 0, so that there is no signal applied over the lines marked X. However, Y is 1, so that a signal is applied over all of the lines marked Y. Furthermore, Z is 0, since in the next lower order the subtracting of 0 from 1 did not require any borrow, so that there is no signal applied to any of the lines marked Z.

The operation of the Fig. 2 circuit in the example being considered will be such that the difference signal, which in this case is a 1, will appear at the output 20 by reason of the Y signal that was applied to the "or" circuit 34 and that passed through the "and" circuit 28 (since there was no signal applied from the output of the inverter 27) to the final "or" circuit 32 and thence to the output 20. The signal appearing at the output 20 indicates a difference in this order as represented by the 1 in the above example.

As to the borrow signal, it will be noted that the three "and" circuits 37, 38 and 39 may be disregarded since there is no "A" control signal applied. Similarly the "and" circuits 29 and 35 may be disregarded since there is no $S_y$ control signal applied. Then, considering the "and" circuits 36, 30 and 31, and observing the input signals applied thereto, it will be seen that no output is had from "and" circuit 31 since there is no borrow applied to the Z line (from the next lower order) and similarly there is no output from the "and" circuit 36 because of the absence of a borrow signal on this Z line (from the next lower order). However, the "and" circuit 30 will produce an output since the control signal $S_x$ is applied and the Y signal is applied (the Y digit is a 1) and furthermore, no signal from the inverter 27 has been applied to the third input of "and" circuit 30. Such an inverter signal would have canceled out or inhibited the inputs from $S_x$ and Y. Therefore, a signal is applied into the "or" circuit 40 from the "and" circuit 30, and will be carried to the output circuit 21 so that a borrow signal is carried to the next higher order. This may be verified in the example taken since X is 0 and Y is 1, in that order.

Carrying the example one step further, the action in the next higher order of the binary number being employed in the above example, i.e., the middle order (where both X and Y are 0's), the subtraction process may be traced as follows: At the "or" circuit 34, a signal will be introduced on the Z line since a borrow signal was sent up from the next lower order, and this signal will pass through the "and" circuit 28 in the same manner as above. This is because no inverter signal from the inverter 27 will exist to cancel or inhibit this signal from the "or" circuit 34. Consequently the "or" circuit 32 will produce an output on the output line 20.

Now, since a borrow was required in this order because of the borrow signal coming up from the next lower order, and the X digit was 0, a borrow signal must be provided at this order to go to the next higher order. This function will be performed by the circuit of Fig. 2 in the following manner: Taking the "and" circuit 31, there will be a control signal existing on the line S, and a borrow signal will also exist on the line Z. However, no inverted signal will be introduced from inverter 27, for the reasons pointed out above. Consequently a signal will be provided at the output of "and" circuit 31 which will feed into the "or" circuit 40 and will provide an output at output 21. This is a borrow signal that will be passed to the next higher order. Thus, the subtraction is made in each order in accordance with the information applied and a direct difference is produced at the output 20 of the unit.

Figure 3:
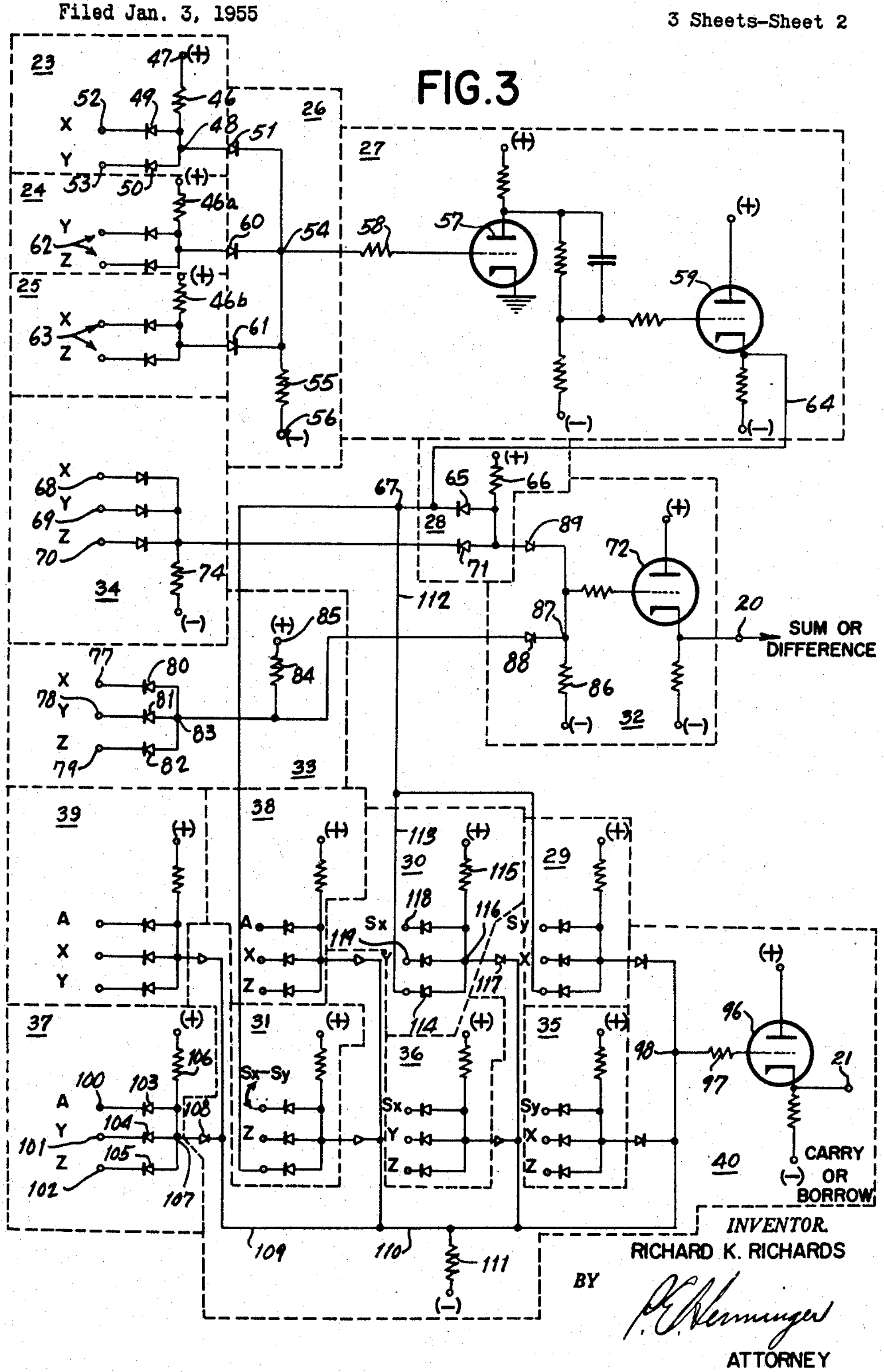
Fig. 3 is a circuit diagram showing one specific circuit in accordance with the block diagram of Fig. 2.

Referring to Fig. 3, it is pointed out that the circuit here shown is one specific arrangement which corresponds to the block diagram circuit illustrated in Fig. 2. In Fig. 3, there is involved a number of voltage dividers including diodes, for creating the desired "and" and "or" switching effects.

In Fig. 3, each block from the diagram of Fig. 2 is indicated by a dotted line block bearing the same reference numeral. It should be understood that the specific "and" and "or" circuits illustrated in Fig. 3 are in themselves conventional, and may be replaced by other suitable equivalent "and" and "or" circuits without departing from the invention.

In the arrangement of Fig. 3, the "and" circuit 23 includes a resistor 46 and two diodes 49 and 50. The resistor 46 is connected between a positive voltage supply 47 and a common junction 48, which is in turn connected to the anodes of the diodes 49 and 50. Connected to the cathodes of diodes 49 and 50 are input terminals 52 and 53 that receive X and Y signals, respectively.

The action of this particular two-input "and" circuit 23 will be clear to one skilled in the art, and may be briefly explained as follows: When there is an absence of signal on the terminals 52 and 53, or either of them, there is in fact a negative potential applied thereto. Consequently considerable current is drawn through the resistor 46 and the diodes 49 and 50 or one of them. Thus, the potential of the junction 48 is substantially below the potential of terminal 47. However, when positive potential signals are applied to terminals 52 and 53 simultaneously, the current flow through the diodes 49 and 50 will be reduced, thereby raising the potential of junction 48 toward that of terminal 47. Consequently, the junction 48 has one potential when signals are received simultaneously at terminals 52 and 53, and a different, more negative, potential under all other input signal conditions. The "and" circuits 24 and 25 have similar elements and function similarly.

The "or" circuit 26 includes a diode 51 having its cathode connected to junction 48 and its anode connected to a junction 54 and thence through a resistor 55 to a negative potential supply 56. Diodes 60 and 61 connect junctions in the "and" circuits 24 and 25, respectively, each corresponding to the junction 48 of "and" circuit 23, to the junction 54.

When the output junction (such as junction 48 of "and" circuit 23) of any one of the "and" circuits 23, 24 and 25 shifts to its more positive value, a current flow from associated positive potential supply through the associated diode (51, 60 or 61) to junction 54 and thence through resistor 55 to negative potential supply 56. The current flow through resistor 55 produces a potential drop which raises the potential of junction 54 above that which exists there when there is no input signal through any of the diodes 51, 60 and 61. Consequently, it may be seen that the "or" circuit 26 produces an output signal at junction 54 whenever an input signal appears at any of the three inputs.

The action of all of the other "and" and "or" system employed in this circuit is basically the same as that just described above and need not be repeated in detail.

The signals from junction 54 are fed through a resistor 58 to an inverter 27 shown as including a triode 57 whose grid is connected through resistor 58 to junction 54. The output of triode 57 is taken from its plate and is coupled to the grid of a triode 59, connected as a cathode follower. The triode 57 inverts the input signal, as is characteristic of plate coupled triodes. The triode 59 serves as an amplifier for that signal. The output from triode 59 is taken from its cathode, and appears as a negative signal when a positive signal is received at the input through junction 54.

The signal from triode 59 is transmitted over a wire 64 to a junction 67 and to the cathode of a diode 65. Diode 65 has its anode connected to one end of a resistor 66. Diode 65 and resistor 66 are parts of "and" circuit 28, which also includes a diode 71.

The output signals from inverter 57 also pass through the junction 67 to the inputs of "and" circuits 29, 30 and 31.

The "and" circuit 28 has a second input through diode 71 from the output of an "or" circuit 34, which includes three input terminals 68, 69 and 70 and a resistor 74.

The output of "and" circuit 28 is connected to one input of "or" circuit 32 which drives the grid of an amplifier triode 72 connected as a cathode-follower and driving the sum or difference output terminal 20.

The "or" circuit 34 and the "and" circuit 33 receive the same input signals X, Y and Z. The output of "or" circuit 34 is fed through one input of "and" circuit 28, which has its other input connected to the output of inverter 27. In order to produce a signal at the output of "and" circuit 28, the inverter 27 must have its output at its most positive value, and there must be received simultaneously a signal from "or" circuit 34. This can happen only when a signal occurs at one of the three inputs X, Y, and Z, when no signal is at the other two.

The "and" circuit 33 produces an output signal only when input signals are received simultaneously at inputs X, Y, Z.

Either an output signal from "and" circuit 28, or an output signal from "and" circuit 33, is effective in the "or" circuit 32 to cause tube 72 to conduct and to produce an output signal at the sum or difference terminal 20. In other words, an output signal appears at terminal 20 when there is an input signal at one only of the inputs X, Y and Z, and also when there are simultaneous input signals at all three inputs.

The output terminal 21 for the carry or borrow signal is connected to the cathode of a tube 96 that has connected to its grid circuit via a resistor 97 an "or" circuit having eight inputs. All of the eight inputs are connected through diodes to a common junction 98 that is also connected to one end of the resistor 97. These eight inputs to the "or" circuit, are the outputs of the eight "and" circuits 39, 38, 37, 31, 30, 36, 29 and 35. These "and" circuits are all generally the same or similar, and only one of them needs to be described in detail.

In the "and" circuit 37, there are three input terminals 100, 101 and 102. These three terminals will receive the signals as designated which correspond to the addition control-signal A for terminal 100, the Y digit signal for terminal 101, and the carry-or-borrow Z signal at terminal 102. These terminals are connected to a voltage divider in the conventional manner via three diodes 103, 104 and 105, which have their anodes connected to one end of a resistor 106 that has the other end thereof connected to a positive potential source as indicated. This constitutes this "and" circuit, and the completion of the voltage divider circuit is had from a common junction 107 via a diode 108 to wires 109 and 110 that lead to one end of a resistor 111, the other end of which is connected to a negative source of potential supply as indicated. This latter portion of the voltage divider, i.e., diode 108, constitutes one of the inputs of the eight input "or" circuit.

The "and" circuits 29, 30 and 31 differ from the other five of the eight "and" circuits which supply signals to the "or" circuit 40, in that each of these three "and" circuits has one input fed through the output of inverter 27. When there is an output from the inverter none of these three "and" circuits can produce an output signal.

Figure 4:
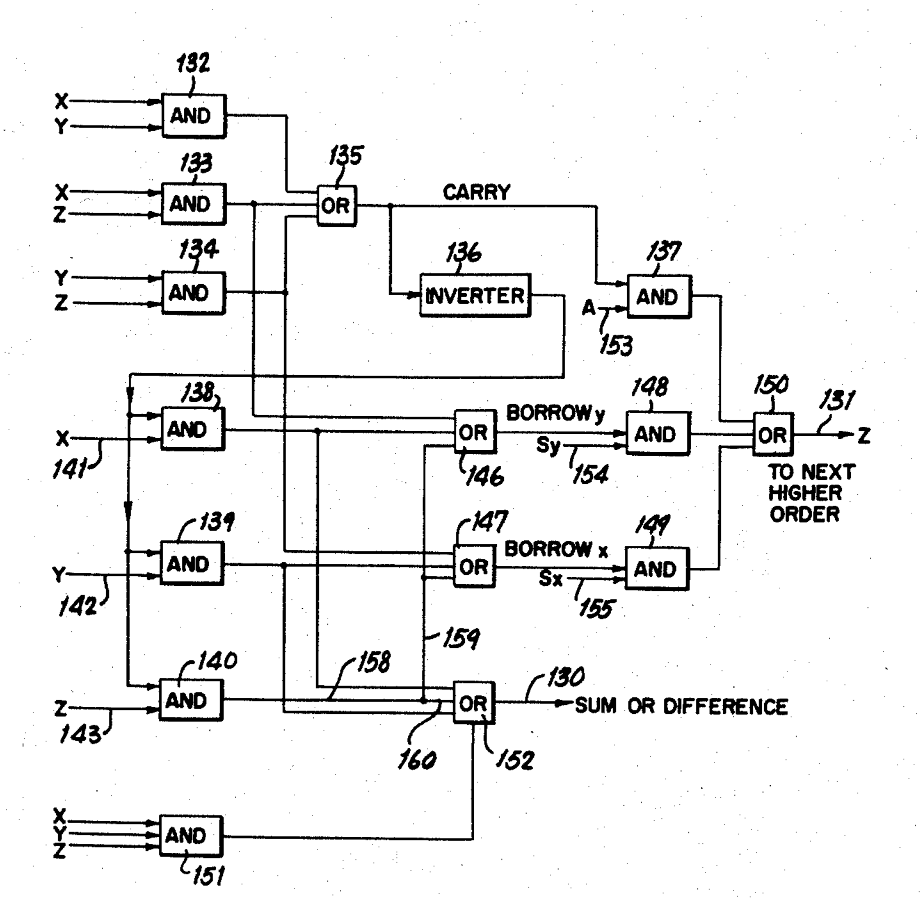
Fig. 4 is a block diagram circuit illustrating another embodiment of the invention.

In Fig. 4 a block diagram circuit is shown for another embodiment of this invention that will accomplish the same binary addition-subtraction results as may be accomplished by the use of a circuit according to Figs. 2 and 3. In Fig. 4 there is an output 130 where the sum or difference signal will be produced, and another output 131 where the carry-or-borrow signal will be produced. In this arrangement there is a group of "and" circuits 132, 133 and 134, respectively having X and Y, X and Z, and Y and Z inputs as shown, all of which have their outputs leading into an "or" circuit 135, which has two outputs in parallel therefrom, one going to an inverter circuit 136 and the other of which goes to an "and" circuit 137. The "and" circuit 137 has a second input connected to the signal source A. The output of "and" circuit 137 is connected to an "or" circuit 150. The output of the inverter circuit 136 leads to three parallel inputs, one for each of three "and" circuits 138, 139 and 140. Each of these three "and" circuits has only a single other input 141, 142 and 143, respectively. At these three inputs an X digits signal, a Y digit signal and a Z (carry or borrow) signal, respectively, are introduced. Consequently, if an inverter output signal from the circuit 136 is present, no output from the three "and" circuits 138, 139 or 140 will be had since even though an input may be present in anyone of these three "and" circuits, it will be cancelled, or inhibited, by the inverter output signal. An "or" circuit 146 has three inputs respectively supplied from the output of "and" circuits 133, 138 and 140. The output from "or" circuit 146 goes to one input of an "and" circuit 148 having a second input connected to the $S_y$ signal source. An "or" circuit 147 has three inputs respectively supplied from the outputs of the "and" circuits 134, 139 and 140. The output of "or" circuit 147 is fed to one input of an "and" circuit 149 having a second input connected to the source of $S_x$ control signals. The outputs of the "and" circuits 148 and 149 are fed to inputs of the "or" circuit 150, which has a third input connected to the output of "and" circuit 137, as mentioned above. The output of "or" circuit 150 produces the carry or borrow signal Z to the next higher order.

An "or" circuit 152 has four inputs respectively supplied by "and" circuits 138, 139, 140 and 151. The output of "or" circuit 152 is the sum or difference signal for the particular numerical order.

The operation of the circuit according to Fig. 4 will be obvious to one skilled in the art upon inspection thereof, but may be made entirely clear by an example. The example to be used is that using the action involved in the application of signals in accordance with a given order digit of the numbers employed in the subtraction example set forth above. Taking the third order digits in the example used in connection with Fig. 2, it will be observed that the input signal status will be as follows: Since the function being performed is subtraction, there will be no A input signal at an input 153 of the "and" circuit 137, and since the subtraction being performed is that where the X digit is the minuend, there will be no $S_y$ control signal applied at an input 154 of the "and" circuit 148. However, there will be an $S_x$ control signal applied at an input 155 of the "and" circuit 149 since the X digit is the minuend. There will be no X or Y signals since both X and Y are zero, but there will be a Z signal since there is a borrow from the next lower order. In view of this state of the control signal inputs, the other inputs to the "and" circuit 137 and 148 may be disregarded since there will be no outputs from these two "and" circuits, in the absence of one of the inputs thereto in each case. However, the "and" circuit 149 will have an input signal applied to the input 155 and another input signal applied to its other input, because a borrow signal from the next lower order will be existing. This borrow signal will enter via the input 143 to "and" circuit 140 and will be applied via a wire 158 and another wire 159 to an input of "or" circuit 147. The output of "or" circuit 147 is the other input of "and" circuit 149, so that the desired output signal for indicating a borrow to the next higher order will be passed on via the "or" circuit 150 to the output 131. This borrow signal as introduced at input 143 will not be inhibited or cancelled by an output signal from the inverter 136, because the conditions are such that the borrow signal from the next lower order cannot be absorbed in the subtraction as it is accomplished at this order, but must be passed on to the next higher order. This desired substraction function is borne out in the action of the circuit, as witness the fact that there are no Y or Z digit inputs, on account of these digits being 0, and therefore there will be no outputs from any of the three "and" circuits 132, 133 or 134.

An output signal at the difference output 130 of the unit will be produced, as may be verified by tracing the action as follows: The input signals as introduced to the unit (aside from the control signals as already set forth above) are: no signal for the X digit, no signal for the Y digit, but a Z signal for the borrow digit from the next lower order. Consequently there will be no output from "and" circuit 151 nor from either of the "and" circuits 138 or 139. However, there will be an output signal from the "and" circuit 140, which will be carried via the wire 158 and a wire 160 to the "or" circuit 152 and then will be passed on to produce an output signal at the output 130. It will be observed that this action then bears out the subtraction as made in a pencil-and-paper manner in accordance with the above explanatory example.

It is to be noted that any of the binary computation units such as those illustrated in Figs. 2, 3 and 4 may be connected together for parallel operation in accordance with the block diagram of Fig. 1. Also, it will be appreciated that the plurality of input circuits for each unit will be ganged or otherwise connected in parallel to receive the indicated signal. In other words, whereas in Figs. 2, 3 and 4 there are a plurality of input terminals that have the indication of an X, which means that they are X digit input terminals, they will all be connected together to receive a signal representing the X digit when such condition exists.

In the operation of a "parallel" calculating machine, i.e. one having units connected in the manner illustrated in Fig. 1, it may be found that a larger binary number is subtracted from a smaller binary number. This would result in a complement of the true difference (provided "end-around borrow" is employed). To correct this situation use may be made of the appearance of a borrow signal in the highest order, which invariably will occur when such a subtraction is made. Then the true difference may be obtained by applying the other borrow signal. In other words, means are provided which respond to a borrow signal from the highest order by cutting off the initial subtract control signal and thereafter turning the opposite subtract control signal on. This operation must be completed while the same digit input signals X, Y and Z are maintained.

When subtracting with a parallel machine, it is necessary to wait for a "ripple through borrow," which is similar to a ripple through carry which can occur in addition. In cases where the wrong borrow signal is used first and it is necessary to switch to the other one it is not necessary to wait an amount of time required for two complete ripple through borrows. The point to this statement may be most easily explained by an example—

| | | | | | | | | | | | | | | | | |
|---|---|---|---|---|---|---|---|---|---|---|---|---|---|---|---|---|
| X | 0 | 0 | 0 | 0 | 0 | 0 | 1 | 1 | 1 | 1 | 1 | 0* | 1 | 1 | 0 | 0 | 1 |
| Y | 0 | 0 | 0 | 0 | 0 | 0 | 1 | 1 | 1 | 1 | 1 | 1 | 1 | 1 | 0 | 0 | 0 |

Suppose Y is being subtracted from X. Here, X and Y refer to entire numbers, not individual digits. A borrow will occur in the order marked with an asterisk and this borrow will "ripple through" all higher orders, that is, all orders to the left. When a borrow appears at the highest order, it will be known that Y is larger than X and that, in effect, X should be subtracted from Y. When X is subtracted from Y a borrow will occur in this example in the lowest order, or the one on the right. This borrow will ripple through but will stop at the order marked with an asterisk. The previous borrow need not "ripple back" but may be canceled from all orders simultaneously by applying $S_y$ a finite time after $S_x$ is removed. This example illustrates that, except for the time required to switch from one borrow signal to the other, subtraction requires no more time than addition even when the wrong borrow signal is chosen first.

In connection with the specific example that is illustrated in Fig. 3, it will be appreciated that various values for the resistors and the positive and negative potential sources of supply may be employed. However, as a specific example in the circuit as shown in Fig. 3, a sample of satisfactory circuit values is the following, where the input signals will be in the nature of given potential levels, e.g., a binary 0 will be represented by a negative potential of about −30 volts, and a binary 1 will be represented by a positive potential of about +10 volts. The "and" resistor 46 may be a 120,000 ohm resistor with a positive potential of +150 volts applied to terminal 47. The "or" resistor 55 may be a 150,000 ohm resistor and a negative potential of −100 volts will be applied to the terminal 56. The plate and cathode resistors for the tubes 57, 59, 72 and 96 may be 8,200 ohm resistors, while the positive potential applied to the plate circuits of each of the tubes may be +150 volts. This sample is sufficient indication for anyone skilled in the art to determine the remaining circuit values for the specific circuit of Fig. 3. Of course, these are not to be taken as limiting the circuit to such values, but merely as being descriptive of one preferred set of values which may be employed.

While certain embodiments of the invention have been set forth in considerable detail in accordance with the applicable statutes, this is not to be taken as in any way limiting the invention, but merely as being descriptive thereof.

It is claimed:

1. A binary adder-subtracter unit for adding or subtracting two series of signals representing two binary numbers, comprising: for each of a plurality of numerical orders, first and second inputs for receiving first and second signals respectively representive of corresponding digits of first and second binary numbers, a third input for receiving a signal representative of a transfer from a lower order, first and second control inputs for receiving signals respectively indicating that the first number is to be subtracted from the second and that the second number is to be subtracted from the first, a transfer output, first logic circuit means to produce a borrow signal at said transfer output in response to a signal at said first control input concurrently with:

(1) signals from said first and third inputs; or
(2) signals from either first or third inputs in the absence of signals from said second input;

second logic circuit means to produce a borrow signal at said transfer output in response to a signal at said second control input concurrently with:

(1) signals from said second and third inputs; or
(2) signals from either of said second or third inputs in the absence of a signal from said first input;

a third control input for receiving a signal indicating that the two numbers are to be added, a sum or difference output, third logic circuit means for producing a signal at said sum or difference output in response to:

(1) a signal at one of said first, second and third inputs in the absence of a simultaneous input signal at a second one of said first, second and third inputs; or
(2) simultaneous signals at each of said first, second and third inputs; and fourth logic circuit means responsive to a signal at said third control input concurrently with signals at two only of said first, second and third inputs to produce a carry signal at said transfer output.

2. A binary adder-subtractor unit as defined in claim 1, in which: said first logic circuit means comprises a first AND circuit responsive to a signal from said third input and a simultaneous signal from either of said first or second control inputs to produce an output signal, a second AND circuit responsive to a signal from said first control input and to a simultaneous signal from said second input and the simultaneous absence of signals from any two of said first, second and third inputs to produce an output signal, a third AND circuit responsive to a signal from said first control input and two concurrent signals from said second and third inputs to produce an output signal, and an OR circuit having inputs connected to the outputs of said first, second and third AND circuits for producing a signal at said transfer output; said second logic circuit means comprises said first AND circuit and a fourth AND circuit responsive to simultaneous signals from said second control input and said first signal input in the absence of simultaneous signals from any two of said first, second and third signal inputs, a fifth AND circuit responsive to simultaneous signals from said second control input and from said first and third signal inputs, and means connecting the outputs of said fourth and fifth AND circuits to additional inputs of said OR circuit; said third logic circuit means comprises a second OR circuit responsive to said first, second and third signal inputs, a sixth AND circuit responsive to the absence of concurrent signals at any two of said first, second and third signal inputs and to the presence of a signal at the output of said second OR circuit, a seventh AND circuit responsive to simultaneous inputs from all of said first, second and third signal inputs, and a third OR circuit responsive to output signals from said sixth and seventh AND circuits for producing a sum or difference signal; and said fourth logic circuit means comprises AND circuit means responsive to simultaneous input signals from said third control input and two of said first, second and third signal inputs, and means connecting the output of said AND circuit means to said first-mentioned OR circuit.

3. A binary adder-subtractor unit as defined in claim 1, in which, said first logic circuit means comprises first OR circuit means effective to produce an output signal in response to:

(1) a signal from the second signal input or the third signal input in the absence of signals from two of the first, second and third signal inputs; or (2) simultaneous signals from the second and third signal inputs;

and a first AND circuit responsive to an output signal from the first OR circuit means and a simultaneous signal from the first control input; said second logic circuit means comprises second OR circuit means effective to produce an output signal in response to:

(1) a signal from the first or third signal inputs in the absence of simultaneous signals from any two of the first, second and third signal inputs; or (2) simultaneous signals from the first and third signal inputs;

a second AND circuit responsive to an output signal from the second OR circuit means and a simultaneous signal from the second control input; said third logic means comprises a third OR circuit means effective to produce an output signal in response to:

(1) simultaneous input signals from all three of the first, second and third signal inputs; or (2) a signal from any one of the first, second and third signal inputs in the absence of signals from the other two thereof;

and said fourth logic circuit means comprises third AND circuit means responsive to simultaneous signals from any two of said first, second and third signal inputs, a fourth OR circuit responsive to output signals from said third AND circuit means and a fourth AND circuit responsive to simultaneous output signals from said fourth OR circuit and from said first control input; and a fifth OR circuit connecting all of said first, second and fourth AND circuit outputs to said transfer output.

4. A binary subtractor unit for subtracting two series of signals representing two binary numbers comprising: for each of a plurality of numerical orders, first and second inputs for receiving first and second signals respectively representative of corresponding digits of first and second binary numbers, a third input for receiving a signal representative of a borrow from a lower order, first and second control inputs for receiving signals respectively indicating that the first number is to be subtracted from the second and that the second number is to be subtracted from the first, a borrow output to a higher order, first logic circuit means to produce a borrow signal at said borrow output in response to a signal at said first control input concurrently with:

(1) signals from said first and third inputs; or (2) signals from either first or third inputs in the absence of signals from said second input;

second logic circuit means to product a borrow signal at said borrow output in response to a signal at said second control input concurrently with:

(1) signals from said second and third inputs; or (2) signals from either of said second or third inputs in the absence of a signal from said first input;

a difference output and third logic circuit means for producing a signal at said difference output in response to:

(1) a signal at one of said first, second and third outputs in the absence of a simultaneous input signal at a second one of said first, second and third inputs; or (2) simultaneous signals at each of said first, second and third inputs.

5. A binary subtracter unit for subtracting two series of signals representing two binary numbers comprising: first and second inputs for receiving first and second signals respectively representative of corresponding digits of first and second binary numbers, a third input for receiving a signal representative of a borrow from a lower order, first and second control inputs for receiving signals respectively indicating that the first number is to be subtracted from the second and that the second number is to be subtracted from the first, a borrow output to a higher order, first logic circuit means to produce a borrow signal at said borrow output in response to a signal at said first control input concurrently with signals from first predetermined combinations of said inputs, second logic circuit means to produce a borrow signal at said borrow output in response to a signal at said second control input concurrently with signals from second predetermined combinations of said inputs, a difference output and third logic circuit means for producing a signal at said difference output in response to signals from third predetermined combinations of said inputs.

6. A binary adder-subtracter unit for adding or subtracting two series of signals representing two binary numbers, comprising: first and second inputs for receiving first and second signals respectively representative of corresponding digits of first and second binary numbers, a third input for receiving a signal representative of a transfer from a lower order, first and second control inputs for receiving signals respectively indicating that the first number is to be subtracted from the second and that the second number is to be subtracted from the first, a transfer output, first logic circuit means to produce a borrow signal at said transfer output in response to a signal at said first control input concurrently with signals from first predetermined combinations of said inputs, second logic circuit means to produce a borrow signal at said transfer output in response to a signal at said second control input concurrently with signals from second predetermined combinations of said inputs, a third control input for receiving a signal indicating that the two numbers are to be added, a sum or difference output, third logic circuit means for producing a signal at said sum or difference output in response to signals from third predetermined combinations of said inputs, fourth logic circuit means responsive to a signal at said third control input concurrently with signals from fourth predetermined combinations of said inputs to produce a carry signal at said transfer output.

(References on following page)

References Cited in the file of this patent

UNITED STATES PATENTS

| | | |
|---|---|---|
| 2,442,428 | Mumma | Jan. 1, 1948 |
| 2,536,916 | Dickinson | Jan. 2, 1951 |
| 2,609,143 | Stibitz | Sept. 2, 1952 |
| 2,692,727 | Hobbs | Oct. 26, 1954 |
| 2,715,997 | Hill | Aug. 23, 1955 |
| 2,795,378 | Beranger | June 11, 1957 |
| 2,803,401 | Nelson | Aug. 20, 1957 |

FOREIGN PATENTS

| | | |
|---|---|---|
| 1,035,312 | France | Apr. 15, 1953 |